Jan. 5, 1971   M. B. PACKER ET AL   3,552,802
MEANS FOR PREVENTING SKIDDING OF VEHICLE WHEELS
Filed Feb. 14, 1969   2 Sheets-Sheet 1

INVENTOR
Marvyn B. Packer
James Justy
Lawrence J. White
BY
ATTORNEY

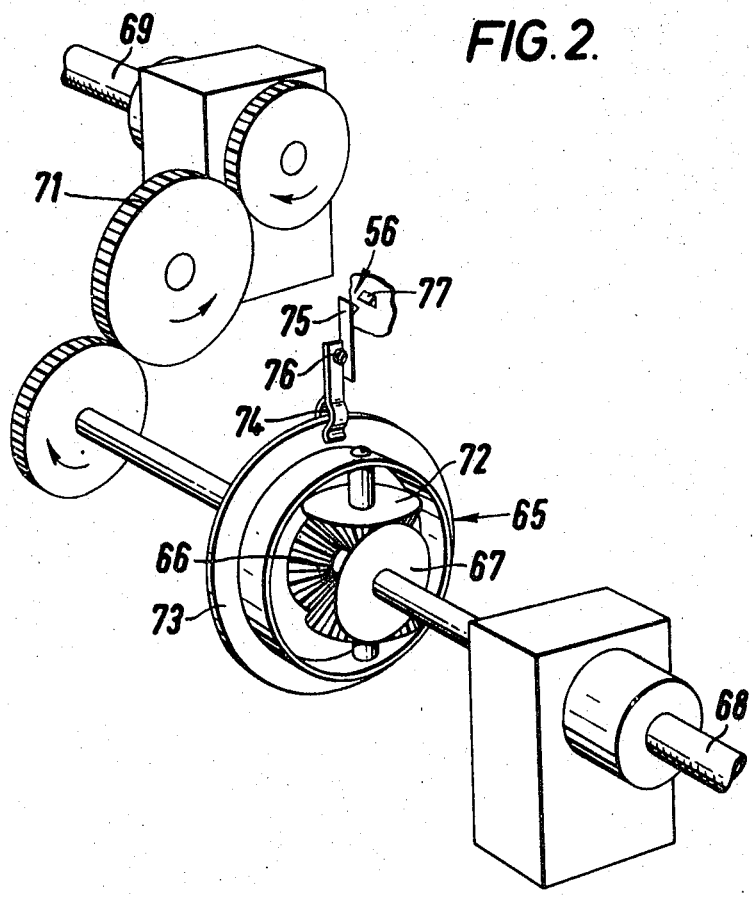

United States Patent Office 3,552,802
Patented Jan. 5, 1971

3,552,802
MEANS FOR PREVENTING SKIDDING OF VEHICLE WHEELS
Mervyn B. Packer and James Jesty, Warwickshire, England, assignors to Automotive Products Company Limited, Warwickshire, England
Filed Feb. 14, 1969, Ser. No. 799,342
Claims priority, application Great Britain, Feb. 15, 1968, 7,478/68
Int. Cl. B60t 8/06
U.S. Cl. 303—21                                5 Claims

ABSTRACT OF THE DISCLOSURE

A fluid pressure braking system, including means operated by a fluid servo-device to isolate a brake operating cylinder from its associated pressure source when a tendency to skid is sensed, and to reduce the pressure in said operating cylinder, has the pressure in the working chamber of the servo motor controlled by a valve actuated by a skid sensing device, the valve being connected to sources of relatively lower and higher pressure and the connection to at least one of said sources being through a flow restricting device, and an auxiliary reservoir being connected between the restriction and the valve so that a rapid initial change in pressure in the working chamber takes place due to equalisation of pressure in the working chamber and reservoir, followed by a slow change due to the flow restriction.

---

Figure 1:
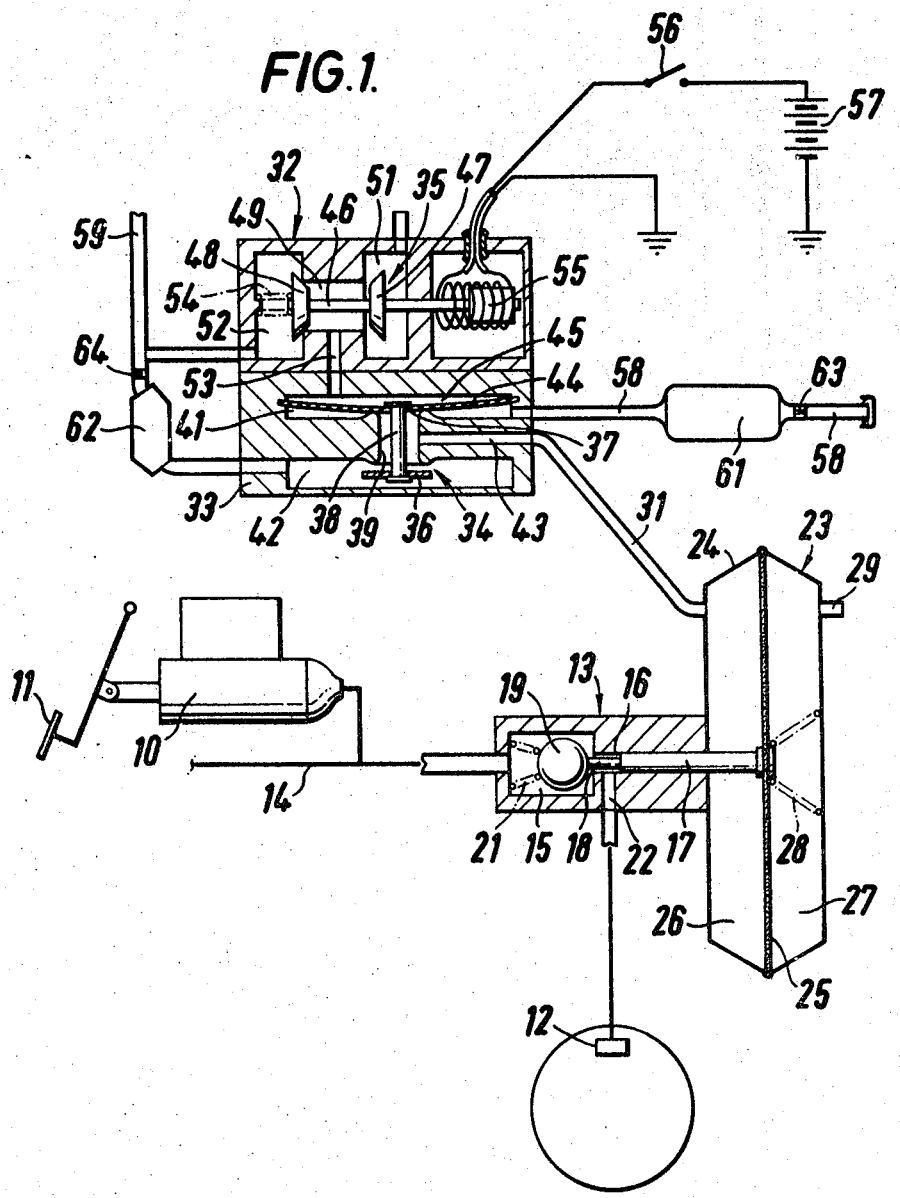

This invention relates to means, referred to as anti-lock means, for incorporation in a fluid pressure actuated braking system of a vehicle, said means being operable to reduce automatically the fluid pressure exerted to apply a brake or brakes acting to resist rotation of a wheel or wheels of the vehicle as a result of a tendency of the said wheel or wheels to skid or to approach conditions in which skidding would commence, so that the braking can be relieved to prevent wheel locking and resultant sliding of the vehicle.

It is desirable that the fluctuations in the braking pressure resulting from the operation of the anti-lock means shall be as small as possible consistent with adequate relief of the brakes, but it is also desirable that cycles of brake relief and re-application shall take place in a short time period to obtain good overall braking.

It is the primary object of the present invention to provide anti-lock means fulfilling these requirements to a great extent.

Moreover, it is now becoming accepted in braking theory that optimum braking occurs when some degree of wheel slip is taking place or, stated in other words, when the circumferential velocity of the surface contact point of a wheel is less than the velocity of the vehicle relative to the said surface. For example, with a vehicle travelling at a velocity of 44 ft. per second, optimum braking may occur when the circumferential velocity of the wheel is 39 ft. per second. It is therefore desirable to so control the braking of a wheel when a tendency to skid occurs, that its speed is maintained at or close to the speed corresponding to the degree of wheel slip giving the optimum degree of braking. To maintain such a speed it is necessary to avoid wide fluctuations of the braking pressure, thus preventing the brakes from being alternately released to an excessive extent and then re-applied to an excessive extent.

It is a further object of the present invention to provide anti-lock means capable of providing control of the braking such that the wheel speed fluctuates to a relatively small extent about the speed for optimum braking.

According to the invention, in anti-lock means for a fluid pressure braking system and comprising a valve device which is normally held open to connect a brake operating cylinder or cylinders to a source of pressure and is closed by a fluid servo device, when a tendency to skid is sensed, to isolate the brake operating cylinder or cylinders from the source of pressure and reduce the pressure in said brake operating cylinder or cylinders, a control valve operable, by a signal from sensing means responsive to conditions tending to produce skidding, to change the pressure in a working chamber of the servo-device by connecting the said working chamber respectively to sources of relatively higher and relatively lower air pressure, is connected to at least one of the said sources through a flow restricting device, and a storage chamber, adapted to be connected to the working chamber of the servo-device by operation of said control valve to connect said working chamber to said source, is also connected to the source through the said flow restricting device, the said storage chamber having a volume such that the equalisation of the pressure therein with the pressure in the working chamber of the servo motor when said chambers are connected by actuation of the control valve causes a substantial change in the pressure in the said working chamber and that pressure changes initially at a greater rate than it would be changed by flow of air through the flow restricting device.

Preferably, both the sources of relatively higher and relatively lower pressure are connected to the control valve through flow restricting devices and two storage chambers are provided which are respectively connected through the control valve to the working chamber of the servo device by operation of the control valve to connect the said working chamber to the respective sources.

The control valve is preferably operated by an air pressure differential acting on a diaphragm, the pressure on one side of the diaphragm being controlled by a solenoid-operated pilot valve controlled by a switching device actuated by the signal from the sensing means.

One embodiment of the invention will now be described by way of example with reference to the accompanying drawings, in which:

FIG. 1 is a diagram of a liquid pressure braking system of the hydrostatic type embodying anti-lock means according to the invention; and FIG. 2 is a perspective view of speed comparison means employed to control the braking system of FIG. 1.

Referring to FIG. 1 of the drawings, the liquid pressure braking system comprises a master cylinder 10 operated by a pedal 11, pressure generated in the master cylinder being applied to brake operating cylinders for the rear brakes of the vehicle, one of which is shown at 12, through a valve device 13. The pressure generated in the master cylinder 10 may also be applied to brakes on the front wheels of the vehicles (not shown), through a branch conduit 14.

The valve device 13 comprises a body in which is a chamber 15 connected at one end to the master cylinder 10, and at the other end to a bore 16 in which is slidable a plunger 17 having a reduced stem portion 18 at its end adjacent the chamber 15. A ball 19 in the chamber 15, urged by a spring 21 on to a seat around the end of the bore 16, is normally held off its seat by the stem 18 to permit liquid pressure from the master cylinder to pass into the bore 16 and through a lateral passage 22 opening from the said bore to the brake operating cylinders 12.

A fluid pressure servo device 23 mounted on one end of the valve body comprises a casing 24 divided by a flexible diaphragm 25 into two chambers 26 and 27, the plunger 17 being fixed to the centre of the diaphragm 25 and being urged by a spring 28, mounted in the chamber 27 and acting on the diaphragm in a direction to unseat the ball 19. The chamber 27 is permanently connected at 29 to a source of relatively low air pressure, for example a subatmosphere pressure, and the chamber 26 is connected by a conduit 31 to a control valve 32, hereinafter described, by means of which that chamber can be selectively connected to a source of relatively low air pressure, for example a sub-atmospheric pressure or to a source of air at a relatively higher pressure.

The control valve 32 comprises a valve body 33 in which are mounted a main valve 34 and a pilot valve 35. The main valve 34 comprises two closure members 36, 37 mounted on opposite ends of a stem 38 extending through a passage 39 connecting first and second chambers 41 and 42, the first chamber 41 being in communication with the atmosphere and the second chamber 42 being in communication with a source of vacuum. A passage 43 branching from the passage 39 is connected by the conduit 31 to the chamber 26 of the servo-device 23 in which the pressure is to be varied. The stem 38 is movable longitudinally of the passage 39 to engage either one of the closure members 36, 37 with a seat at the appropriate end of the passage, and open the other end of the passage. The first valve chamber 41 is closed by a diaphragm 44 to which the stem 38 and valve closure members 36, 37 are connected, the pilot valve 35 being arranged to connect a third chamber 45 on the side of the said diaphragm 44 opposite to the chamber 41 to the atmosphere or to a source of vacuum.

The pilot valve 35 comprises a spool member 46 having two heads 47 and 48 adapted to seat one at each end of a passage 49 connecting two chambers 51 and 52 themselves connected respectively to the atmosphere and to a source of vacuum, the said passage 49 having a branch 53 leading into the third chamber 45 of the main valve 34. A spring 54 urges the spool member 46 in a direction to close off the passage 49 from the pilot valve chamber 52 which is connected to vacuum, and to open the said passage 49 to the pilot valve chamber 51 which is connected to the atmosphere, a solenoid 55, the circuit of which is controlled by a switching device such as a switch 56 in an electrical circuit including the solenoid 55 and a source of current 57 acting, when energised, to move the pilot valve spool member 46 to the opposite position. In conduits 58 and 59 leading from the atmosphere and from the source of vacuum respectively to the first and second main valve chambers 51 and 52 there are provided additional chambers 61 and 62 connected to the atmosphere and vacuum sources through flow-restricting orifices 63 and 64 respectively but having free communication with the corresponding valve chambers. The chambers 61 and 62 may be connected to the conduits 58 and 59 by short branch conduits, the flow-restricting orifices 63 and 64 being positioned in the conduits 58 and 59 on the sides of the branches remote from the main valve chambers 41 and 42.

The switching device may be controlled by a signal from any form of sensing device responsive to slipping of a wheel the braking of which is to be controlled, or to conditions tending to produce such slipping.

For example, as shown in FIG. 2, the sensing device which controls the switch 56, comprises a gear differential unit 65 having co-axial input bevel gears 66 and 67 one of which, 66, is driven by a fifth wheel or other device (not shown) the speed of rotation of which is a measure of the speed of the vehicle, the other input bevel gear 67 being driven in the opposite direction at a speed which is a measure of the speed of rotation of a wheel of the vehicle. As shown, the bevel gear 67 may be driven through a flexible shaft 68 from the propeller shaft of the vehicle, and the bevel gear 66 may be driven through a flexible shaft 69 from a fifth wheel, gearing 71 being provided in the drive to the bevel gear 66 so that the two bevel gears are driven at the same speed one with respect to the other when the wheel speed is less than the vehicle speed by an amount producing the degree of slip for optimum braking. Bevel pinions 72 meshing with both input bevel gears 66 and 67 are carried by a rotatable ring 73 with which is frictionally engaged a member 74 pivoted at 76 and carrying the moving contact 75 of the electrical switch, the switch 56 being open so long as the speed of the input gear 67 exceeds that of the input bevel gear 66, but being closed when the input bevel gear 66, the speed of which is determined by the vehicle speed, rotates at a higher speed than the other driving bevel gear 67.

So long as there is no tendency for the wheels of the vehicle to skid, the input bevel gear 67 of the comparison device runs at a higher speed than the input bevel gear 66, and the moving contact 75 of the switch 56 is held away from the fixed contact 77, so that the switch remains open. The pilot valve 32 therefore provides communication between the third chamber 45 of the main valve 34 and the atmosphere. The main valve 34 therefore closes off the servo motor chamber 26 from the atmosphere and connects it to vacuum. There is consequently vacuum in the chambers 24 and 25 on both sides of the servo motor diaphragm 25 and the valve ball 19 in the valve device 13 is held open by the spring 28.

As soon as a speed differential exceeding that corresponding to the degree of slip for optimum braking is applied to the differential gear unit 65, the switch 56 is closed and the pilot valve 32 is changed over, causing vacuum to act on the diaphragm 44 of the main valve 34, moving the closure members 36 and 37 of the latter to connect the servo-device chamber 26 to the atmosphere. The servo-device 23 is thus operated to close the ball valve 19 and reduce the pressure acting to apply the brakes.

At the initial opening of the main valve 34 to atmosphere, the pressures in the working chamber 26 of the servo-motor and in the chamber 61 tend to equalise and air flows rapidly to the working chamber 26 of the servo-device 23 from the additional chamber 61 in the air supply conduit 58, giving a rapid initial operation of the servo device 23 and a gradual continued build-up of pressure therein once the pressures have equalised, due to the restriction at 63 of flow of air into the additional chamber 61. As soon as the wheel grip is restored sufficiently to enable the wheel to speed up to the optimum slip speed the switch 56 is reopened, the pilot valve spool 49 is moved in the opposite direction, and the working chamber 26 of the servo-device 23 is connected to vacuum. Initially, air escapes rapidly from the said working chamber 26 of the servo-device 23 into the additional chamber 62 in the conduit 59 leading to the vacuum source, but once the pressures in the servo-device chamber 26 and in the additional chamber 62 are equalized the outflow of air is limited by the flow restrictor 64 in that conduit. Thus for both energisation and release of the servo-device 23 there is an initial quick response followed by a relatively slow build-up or release of pressure providing a quick change over from brake relief to brake application and vice versa whilst preventing an excessive degree of such relief or application, and enabling the difference between vehicle speed and circumferential wheel speed to be kept near its optimum value. The degree of initial actuation of the servo-device 23 at each changeover, and the rate of continued supply or extraction of air are governed by the volumes of the additional chambers 61 and 62 respectively and the sizes of the orifices of the restrictors 63 and 64, the volumes of the chambers 61 and 62 being such that the equalisation of the pressure in either one of them with the pressure in the working chamber 26 causes a substantial change in the pressure in the said working chamber.

It will be understood that the control valve may take forms other than that specifically described, any control valve providing rapid change-over of the servo-device connection to atmosphere or vacuum in response to an electrical signal being suitable.

Whilst it is preferred to provide chambers such as those shown at 61 and 62 associated with the connections of the control valve to both the sources of air at relatively lower and higher pressures, such a chamber may be provided in association with only one of said connections, the other source being connected to the control valve without the intervention of flow restricting means.

Whilst the invention has been particularly described with reference to liquid pressure operated brakes of the hydrostatic type, it may also be applied to liquid pressure braking systems of the kind in which a continuous flow of pressure liquid is provided to maintain pressure in the brake operating cylinders, or to air pressure braking systems, the valve device 13, for such applications, being replaced by a valve device which, when operated by the servo-device, shuts off the brake operating cylinders from the pressure source and connects them to an exhaust or drain.

The anti-lock means may be applied to all or to any selected ones of the wheels of a vehicle, and the input member of the differential gear unit which rotates at a speed dependent on wheel speed may be driven directly by a wheel of the vehicle instead of by a propeller shaft.

The term "vehicle braking system" as used herein is to be understood as including braking systems for rail vehicles or aircraft as well as braking systems for road vehicles.

We claim:

1. An anti-lock means for a fluid pressure vehicle braking system comprising a servo-device with diaphragm means therein providing a working chamber therein, a valve member operatively connected to said diaphragm means and normally held open to connect a brake cylinder to a source of fluid pressure until a tendency to skid is sensed, conduit means in communication with said working chamber and with a first reservoir chamber and a second reservoir chamber with control valve means in said conduit means to selectively connect said working chamber with one of said reservoir chambers, said first reservoir chamber being in communication with the atmosphere and having flow restrictor means disposed between it and its atmospheric inlet, said second reservoir chamber being in communication with a source of vacuum and having flow restrictor means disposed between its inlet and its source of vacuum, and pilot valve means operatively connected to sensing means and to said control valve means to actuated said control valve means to communicate said conduit means with said first reservoir chamber to supply relatively high pressure to said working chamber when a tendency to skid is sensed to close said valve member, and to communicate said conduit means with said second reservoir chamber when said skid tendency has passed to permit opening of said valve member.

2. The anti-lock means of claim 1 wherein said control valve means includes a diaphragm operated by differential air pressure acting thereon, and said pilot valve means includes a solenoid and said sensing means includes a switching device.

3. Anti-lock means according to claim 2, wherein the sensing means comprises a gear differential unit having first and second input members driven respectively in opposite directions by a road wheel or the drive transmission of the vehicle and by a member driven at a speed bearing a constant relation to vehicle speed, the gear differential unit having an output member frictionally connected to the moving contact of the electrical switch the arrangement being such that rotation of the output member due to the first input member rotating at a speed less than that of the second input member brings the said moving contact into engagement with the fixed contact of the switch, and rotation of the output member due to the first input member rotating at a speed greater than that of the second input member moves the moving contact away from the fixed contact.

4. Anti-lock means according to claim 3 wherein the second input member is driven by a fifth wheel.

5. Anti-lock means according to claim 4, wherein for any vehicle speed, the second input member of the gear differential unit is driven at a speed which is less than that at which the first input member is driven when the road wheel or drive transmission by which it is driven is rotating at a speed corresponding to the speed of the vehicle.

References Cited
UNITED STATES PATENTS

| | | | |
|---|---|---|---|
| 2,975,003 | 3/1961 | Sandor | 303—21 |
| 3,306,677 | 2/1967 | Dewar et al. | 303—21 |
| 3,403,945 | 10/1968 | Dewar et al. | 303—21 |
| 3,411,835 | 11/1968 | Davis | 303—21 |
| 3,415,577 | 12/1968 | Walker | 303—21 |

MILTON BUCHLER, Primary Examiner

JOHN J. McLAUGHLIN, Jr., Assistant Examiner

U.S. Cl. X.R.

303—40, 61, 72